United States Patent [19]

Kumm et al.

[11] Patent Number: 4,714,452
[45] Date of Patent: Dec. 22, 1987

[54] ORIENTED FLAT BELT CONTINUOUSLY VARIABLE TRANSMISSION USING PULLEYS WITH GUIDEWAYS

[76] Inventors: Emerson L. Kumm, 1035 E. Laguna Dr., Tempe, Ariz. 85282; Theodore C. Kraver, 225 W. Orchid La., Phoenix, Ariz. 85021

[21] Appl. No.: 871,254

[22] Filed: Jun. 6, 1986

[51] Int. Cl.$^4$ .................. F16H 11/02; F16H 55/54
[52] U.S. Cl. .................................. 474/49; 474/53
[58] Field of Search .................. 474/49, 47, 51, 53, 474/56, 57

[56] References Cited

U.S. PATENT DOCUMENTS

| 672,962 | 4/1901 | Seymour | 474/53 |
| 4,295,836 | 10/1981 | Kumm | 474/53 |
| 4,591,351 | 5/1986 | Kumm | 474/53 X |

FOREIGN PATENT DOCUMENTS

0159790  3/1921  United Kingdom .................. 474/56

Primary Examiner—Stephen J. Novosad
Assistant Examiner—Thuy M. Bui
Attorney, Agent, or Firm—Charles E. Cates; Victor Myer

[57] ABSTRACT

In a continuously variable belt transmission system utilizing a drive pulley and a driven pulley having logarithmic spiral guideways in the pulley disks, the balance actuator torque is reduced significantly by having the logarithmic spiral guideways connected directly to the shaft of the driving pulley in a sense opposite to that of the direction of belt movement and in the case of the driven pulley having the sense of the logarithmic spiral guideways connected directly to the shaft the same as that of the driving belt.

4 Claims, 13 Drawing Figures fig. 5d fig. 5e fig. 2 fig. 4 fig. 7 fig. 3

ORIENTED FLAT BELT CONTINUOUSLY VARIABLE TRANSMISSION USING PULLEYS WITH GUIDEWAYS

BACKGROUND OF THE INVENTION

This invention relates to improvements in the operating system, method and apparatus for flat belt continuously variable transmission systems utilizing variable ratio pulleys. Such pulleys are of the nature disclosed in U.S. Pat. Nos. 4,295,836, Oct. 20, 1981 and 4,591,351, May 27, 1986, Emerson L. Kumm, and it is an object of the invention to provide an improved system method and apparatus of the nature indicated. The disclosures of these two patents are incorporated by reference into this specification. Systems of the nature disclosed in the two patents referred to utilize two variable ratio pulleys connected by a flat belt.

The variable ratio is achieved by making each pulley of two pairs of pulley disks, one pair of which is inside of the other pair such that the space between the inner pulley disks defines a space within which the flat belt runs. The inner pulley disks of each pulley are connected rigidly together so as to run as a unit and each pulley disk has logarithmic spiral guideways in it. The two outer pulley disks are also connected together as a unit and each of them includes logarithmic spiral guideways therein. The spiral guideways of the inner set of pulley disks are directed in one sense, clockwise or counterclockwise proceeding to larger radii, and the logarithmic spiral guideways in the outer set of pulley disks are directed in the opposite sense. Thus the guideways of the pulley disks adjacent each other on each side of the pulley form intersections. Belt drive elements are disposed between the intersections around the full circumference of the pulleys and thus the belt engaging the drive elements causes one pulley to drive the other.

The properties of the logarithmic spiral guideways are those as described in the patents referred to and the intersections of the guideways in the inner and outer guideway disks are at right angles to each other, that is, at ninety degrees. In the U.S. Pat. No. 4,295,836 the directional sense of the logarithmic spiral guideways with respect to the direction of the belt movement is the same for the drive pulley as the driven pulley. In the U.S. Pat. No. 4,591,351 the showing of the logarithmic spiral guideways in one directional sense in one pulley and in the opposite directional sense in the other pulley is an incidental fact not related to the present invention. In neither case is there an awareness of the relationship between the sense or direction of the logarithmic spiral guideways and the hydraulic pressure necessary to rotate one set of guideway disks relative to the other set of guideway disks for changing the diameter of the pulley, or that the direction of movement of the belt also affects the required hydraulic operating pressure.

The applicant has discovered that the required hydraulic pressure is reduced to a minimum if the directional sense of the logarithmic spiral guideways connected directly to the shaft of the driving pulley are opposed to the direction of belt movement and the logarithmic spiral guideways which are connected directly to the shaft of the driven pulley are in the same sense as the direction of belt movement.

It is an object of the invention to provide improved apparatus and system which takes advantage of this discovery in making continuous variable transmission drives of the nature involved in this application.

BRIEF DESCRIPTION OF THE INVENTION

In carrying out the invention according to one form, there is provided a belt drive system comprising a driving pulley and a driven pulley, a belt extending around the pulleys, each of the driving and the driven pulleys including a first pair of inner pulley disks having logarithmic spiral guideways of one sense formed therein and mounted for rotation as a unit on a shaft and fixed to the shaft and a second pair of outer pulley disks having logarithmic spiral guideways of an opposing sense formed therein and mounted for rotation as a unit on the shaft but having limited circular movement relative to the first pair of pulley disks, one of the second pair of pulley disks being disposed adjacent but exterior to one of the first pair of pulley disks and the other one of the second pair of pulley disks being disposed adjacent but exterior to the other one of the first pair of pulley disks, the logarithmic spiral guideways of the one of the first pair of pulley disks and the logarithmic spiral guideways of the one of the second pair of pulley disks forming first intersections, the logarithmic spiral guideways of the other one of the first pair of pulley disks and the logarithmic spiral guideways of the other one of the second pair of pulley disks forming second intersections, belt drive elements extending between respective ones of the first and the second intersections, the belt extending around the belt drive elements of the driving pulley and the belt drive elements of the driven pulley, and having a designated direction of rotation the sense of the logarithmic spiral guideways of the first pair of inner pulley disks of the driving pulley being opposed to the designated direction of rotation, the sense of the logarithmic spiral guideways of the first pair of inner pulley disks of the driven pulley being the same as the designated direction of rotation, and hydraulic means associated with the second pair of outer pulley disks of each of the driving and driven pulleys for rotating the second pair of outer pulley disks relative to the first pair of inner pulley disks.

Further objects of the invention will become apparent as the description proceeds.

BRIEF DESCRIPTION OF THE DRAWINGS

For a more complete understanding of the invention reference should be made to the accompanying drawings in which

FIGS. 5b and 5c 1 are enlargements of two specific portions of FIG. 5a showing the forces involved;

FIG. 6a is a view similar to FIG. 5a with the sense of direction of the spiral grooves reversed relative to those in FIG. 5a;

DESCRIPTION OF THE PREFERRED EMBODIMENT

Figure 1:
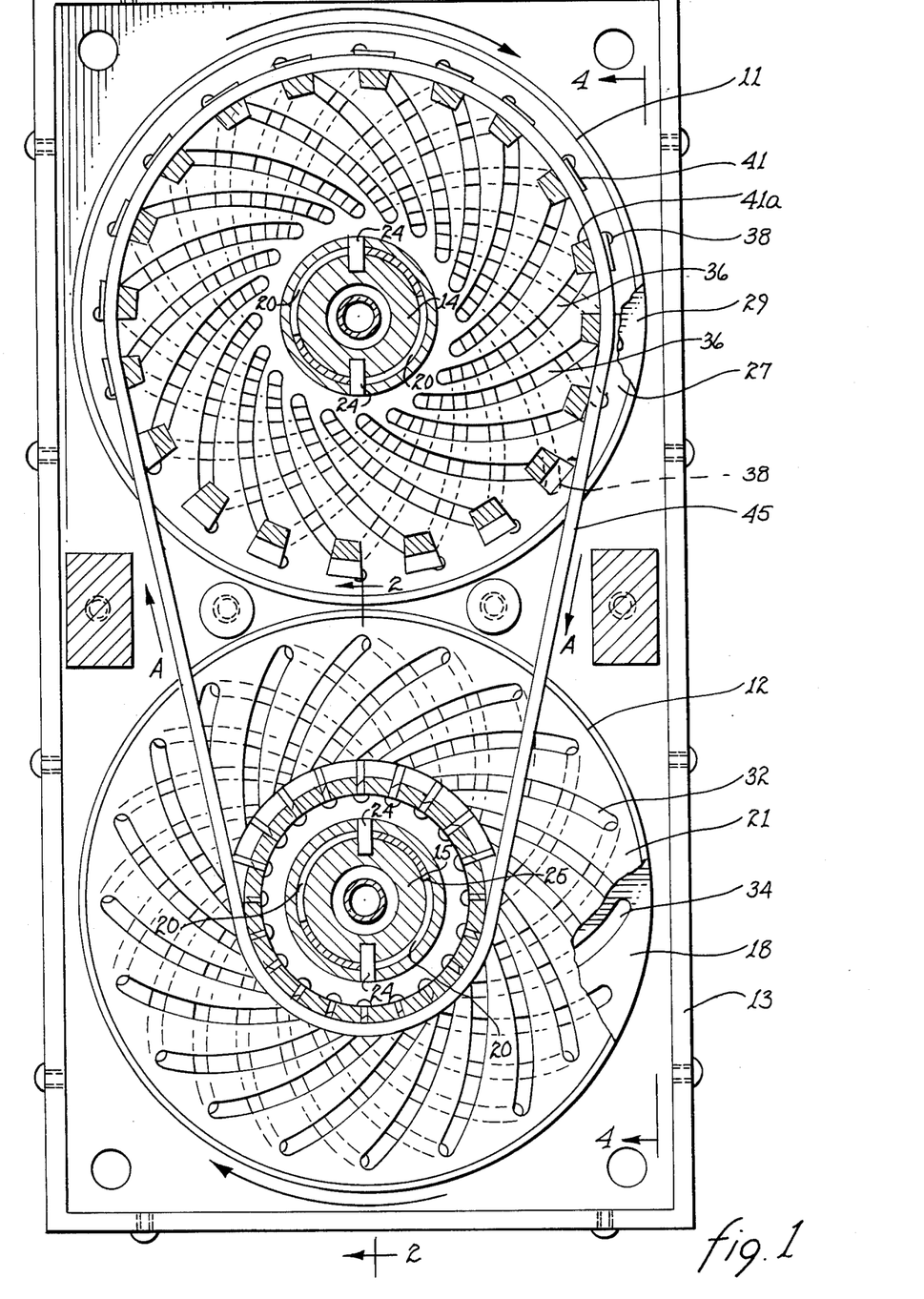
FIG. 1 is a sectional view, partially broken away, of apparatus according to the invention and may be considered to have been taken along the lines 1—1 of FIG. 2.

Referring to FIG. 1 of the drawings there is shown a pair of pulleys 11 and 12 mounted according to the invention in a frame 13, as shown, the pulley 11 being the driving pulley and pulley 12 being the driven pulley, although this may be changed as will become clear. The pulleys 11 and 12 are essentially identical to each other with the exception of the sense or direction of the logarithmic spiral guideways therein as will be explained. The pulley 11 is mounted on a shaft 14 and the pulley 12 is mounted on a shaft 15. Inasmuch as the pulleys are essentially duplicates of each other only the driven pulley 12, its shaft and related structure will be specifically described as shown in FIG. 2.

The shaft 15 is supported in the frame 13 by means of well-known types of ball bearings 16 and 17. The pulley 12 comprises a pair of inner guideway disks 18 and 19 and a pair of outer guideway disks 21 and 22. The inner guideway disks 18 and 19 are press fitted onto a collar 23 which surrounds the shaft 15 and is keyed thereto by keys 24 disposed in keyways on the shaft 15. The inner guideway disks 18 and 19 accordingly form a rigid unitary structure which rotates as a unit with the shaft 15. The outer guideway disks 21 and 22 are press fitted onto a collar 25 which also surrounds the shaft 15 and is interior of the collar 23. The collar 25 is rotatably moveable within prescribed limits as will be made clear. The outer guideway disks 21 and 22 thus also are rigidly connected to each other and operate as a unit even though rotatably mounted on the shaft 15. As shown in FIG. 1, the keys 24 project through a circumferential slot 20 in the collar 25 for the keys 24 to move therein when the outer guideway disks 21, 22 and collar 25 assembly rotates relative to the inner guideway disk 18, 19 and collar 23 assembly during operation as will be explained.

Figure 2:
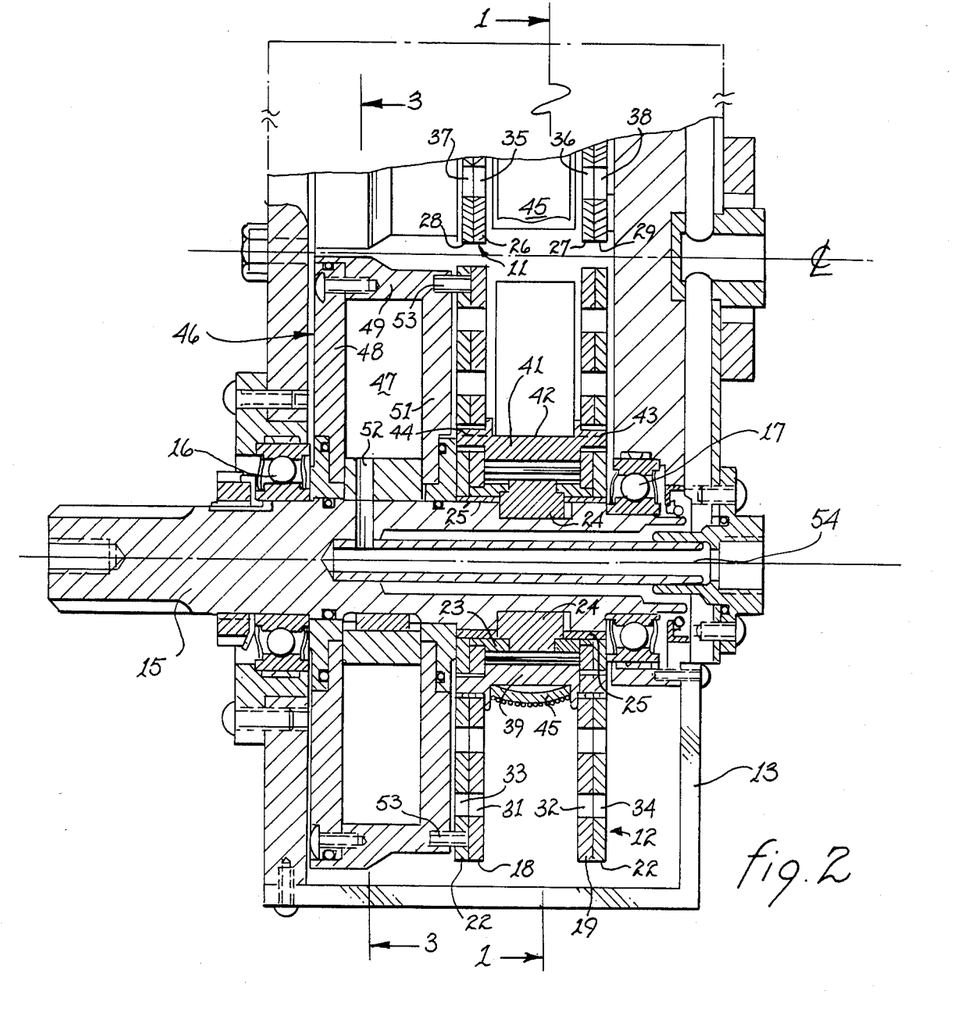
FIG. 2 is a partial sectional view taken substantially in the direction of arrows 2—2 of FIG. 1.

The drive pulley 11 is partially shown in FIG. 2, the inner guideway disks being 26 and 27 and the outer guideway disks being 28 and 29. The inner guideway disks 18 and 19 and the outer guideway disks 21 and 22 of pulley 12 are flat disks lying immediately adjacent each other as may be visualized in FIG. 2. Similarly, the inner guideway disks 26 and 27 and the outer guideway disks 28 and 29 of pulley 11 are flat disks and lie immediately adjacent each other essentially as shown.

The inner guideway disks 18 and 19 have logarithmic spiral guideways 31 and 32 therein, respectively, and the outer guideway disks 21 and 22 have logarithmic spiral guideways 33 and 34 formed therein as will be more particularly described. Similarly the inner guideway disks 26 and 27 have logarithmic spiral guideways 35 and 36 therein and the outer guideway disks 28 and 29 have logarithmic spiral guideways 37 and 38 therein, as will be more particularly described. The logarithmic spiral guideways 31 and 33 intersect with each other as do the logarithmic spiral guideways 32 and 34 of pulley 12. Extending between these intersections is a belt drive element 39. Referring to FIG. 1 it will be seen that there is a belt drive element 39 at the intersections of the logarithmic spiral guideways in each of the inner and outer guideway disks 19 and 22 respectively. Similarly, in the case of the driving pulley 11 there is a belt drive element 41 at the intersection of each of the logarithmic spiral grooves in the inner and outer guideway disks 27 and 29 respectively.

Referring to FIG. 1, a particular belt drive element 41a is shown at the intersection of the logarithmic spiral guideways 36 and 38 of inner and outer guideway disks 27 and 29, respectively. It may be visualized that as the outer guideway disk 29 rotates counterclockwise relative to the inner guideway disk 27 the particular belt drive element 41a will move inwardly toward the center of the shaft. This would continue until the inner end of the logarithmic guideway 36 and the inner end of the logarithmic guideway 38 intersect and the belt drive element 41a is at its innermost position, for example, as shown for belt drive elements 39 of pulley 12 of FIG. 2.

The logarithmic spiral guideways 36 and 38 of guideway disks 27 and 29 intersect at right angles to each other as is characteristic of the preferred logarithmic spiral thereby forming a substantially square bearing area having four sides against which the square ends of the belt drive elements may bear in being part of the driving or driven pulley.

Referring to FIG. 2 and noting the belt drive elements 39 and 41, it will be seen that the belt drive elements have a drive surface 42 which lies on the center line of the square ends 43 and 44 of the belt drive elements. Reduced stresses are thus achieved as is considered in the Kumm U.S. Pat. No. 4,591,351. The belt drive elements 39, 41 extend between the inner and outer guideway disks. Thus it may be visualized that as the outer guideway disks 21, 22 and 28, 29 rotate relative to their respective inner guideway disks 18, 19, and 26, 27, the belt drive elements move inward radially and outward radially, respectively, as required by a belt 45 of fixed length which is wrapped around them. Additional details of the guideway disks and the belt drive elements may be found in the Kumm patents referred to.

The outer guideway disk assembly is rotatable within a limited extent relative to the inner guideway disk assembly as has already been indicated, this being carried out by, for example, by a hydraulic mechanism now to be breifly described. A similar mechanism and one which may be used here is disclosed in the Kumm U.S. Pat. No. 4,295,836.

Again referring to FIG. 2, the hydraulic mechanism is identified by the reference character 46 which comprises a closed chamber 47 having four walls, in effect, 48, 49, 51 and 52, the wall 51 being adapted to be attached to and rotating with the outer guideway disk 21 using, for example, pins 53. The inner and outer walls of the chamber 47 are sealed relative to the shaft 15 so that hydraulic pressure supplied to the chamber 47 through a central passageway 54 in the shaft 15 will supply pressure for causing the inner and outer guideway disk assemblies to rotate relative to each other.

Figures 3, 7:
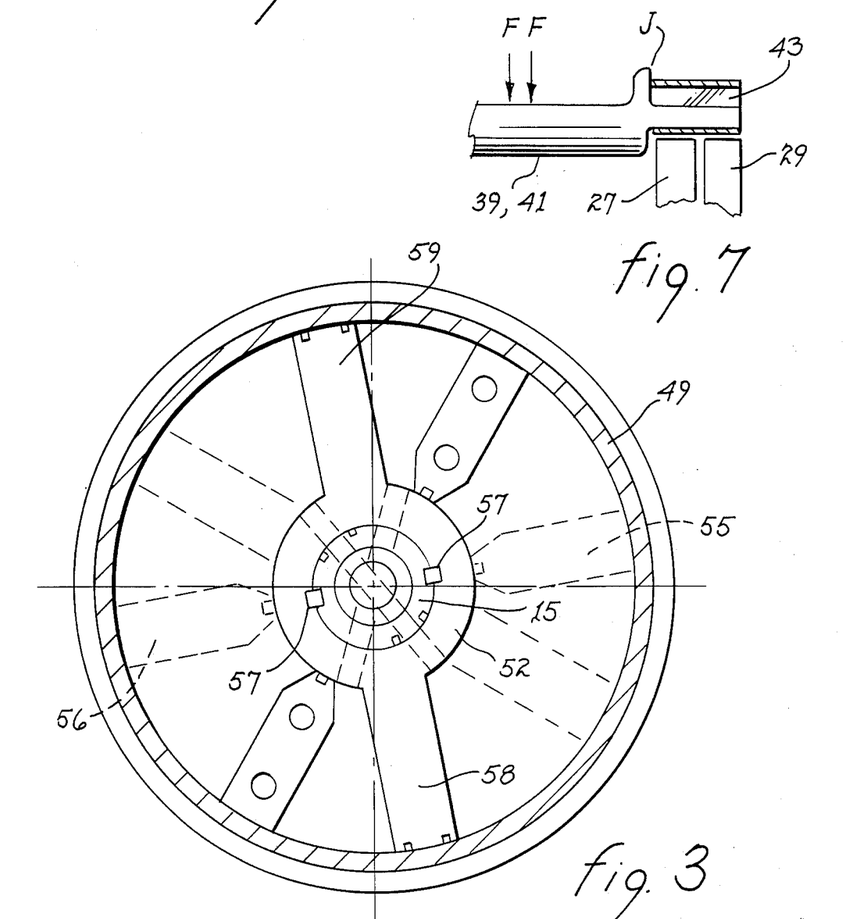
FIG. 3 is a sectional view taken substantially in the direction of arrows 3—3 of FIG. 2.
FIG. 7 is a fragmentary diagrammatic view taken at the location of any belt drive element.

Referring to FIG. 3 there is shown a sectional view of the hydraulic mechanism wherein the outer wall 49 includes a pair of housing struts 55 and 56 and integral therewith. The inner wall 52 is, in effect, a collar surrounding the shaft 15 and keyed thereto by keys 57. The collar (wall) 52 includes a pair of shaft struts 58 and 59 integral therewith. It is evident that the spaces between the housing struts 55 and the shaft struts 58 define chambers whereby the shaft strut 58 may assume various positions depending upon the hydraulic pressure within the chamber, the hydraulic pressure being supplied through appropriate passageways in shaft 15.

The hydraulic means described, namely the chamber 47 and operating components which rotate the outer guideway disks relative to the inner guideway disks may be termed the hydraulic rotary actuator.

The manner of supplying hydraulic pressure to the hydraulic means 46 including the apparatus as described is not a specific part of the invention disclosed in this application. The hydraulic means 46 is one of a type that may be used to supply the necessary hydraulic pressure. That system disclosed in the Kumm U.S. Pat. No. 4,295,836 also is one which will serve that same purpose. Others, of course, may be devised.

Prior to the subject invention, applicant did not appreciate there was a preferred relationship between the direction of rotation of the belt extending from the driving pulley to the driven pulley, the sense or direction of the logarithmic spiral grooves, or guideways, in the driving pulley and driven pulley relative to the belt direction. It was appreciated of course that hydraulic pressure was necessary to rotate one portion of the pulley relative to the other portion in order to tension the belt by the belt drive elements. But the fact that the pressure necessary may be reduced to a minimum if the logarithmic guideways extend in a particular sense or direction relative to the direction of belt movement was not known or understood. Accordingly in the U.S. Pat. No. 4,295,836 the logarithmic spiral guideway of the driving and the driven pulley exten in the same sense or direction. And, in the U.S. Pat. No. 4,591,351 the senses of the logarithmic spirals of the driving and driven pulleys are opposite to each other but there is no indication of a relationship therewith concerning the direction of belt movement and involving the necessary magnitude of hydraulic pressure.

Applicant has discovered that there is a relationship between the direction or sense of the logarithmic spiral guideways as between the driving and the driven pulley and with respect to the direction of belt rotation. This is the substance of the subject invention. Applicant has discovered that by selecting the logarithmic spiral guideways of the driving pulley and the driven pulley to be in the opposite senses relative to each other and that the sense of the logarithmic spiral guideways in the guideway disks not connected to the hydraulic rotary actuator in the driving pulley should be opposite to that of the direction of belt movement and as to the driven pulley the direction of the logarithmic spiral guideways in the guideway discs not connected to the hydraulic rotary actuator should be the same as the direction of belt movement.

Figure 4:
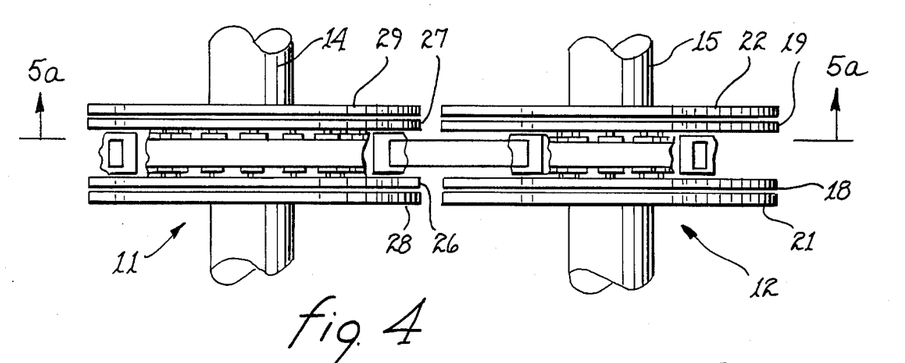
FIG. 4 is a fragmentary view partially diagrammatic and on a smaller scale taken substantially in the direction of the arrows 4—4 of FIG. 1.
Figure 5A:
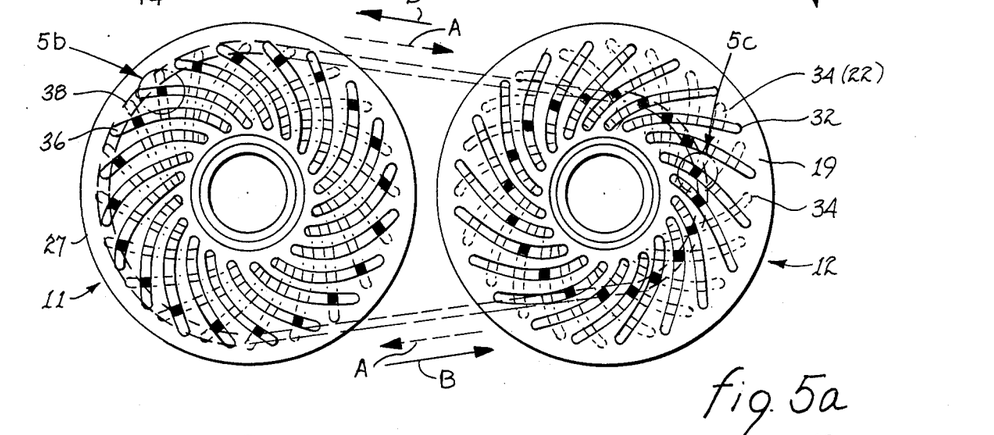
FIG. 5a is a view taken substantially in the direction of arrows 5—5 of FIG. 4.

This relationship is brought out in the following paragraphs of this application when considering the FIGS. 5a to 6c. However, before proceeding with a consideration of the force diagrams shown in FIGS. 5b, 5c, 5d, 5e and 6b and 6c, reference may be made to FIG. 4 in which there is, in effect, a top or plan view of the driving and driven pulleys 11 and 12 having inner and outer guideway disks including logarithmic spirals as described. FIG. 5a is in effect a sectional view taken in the direction of arrows 5a—5f FIG. 4 and FIG. 6a is similar to FIG. 5 except that the sense or direction of the logarithmic spiral guideways is reversed.

Referring to FIG. 5a, which is in effect, a figure reduced in size and similar to FIG. 1 in the showing of the logarithmic spiral guideways of the pulleys and other mechanisms. Thus in FIG. 5a the logarithmic spirals 36 of inner guideway disk 27 extend in the opposite direction as compared to the direction of belt movement shown by the arrow A. Of couse the logarithmic spirals 38 shown dotted and existing on outer guideway disk 29 extend in the opposite sense to the logarithmic spiral 36, i.e., in the direction of belt movement. Correspondingly for the driven pulley 12 of FIG. 5a, the logarithmic spiral 32 in the inner guideway disk 19, extend in the same sense as the arrow A of the drive belt. And the logarithmic spirals 34 in the outer guideway disk 22 extend in the opposite sense.

Figure 5B:
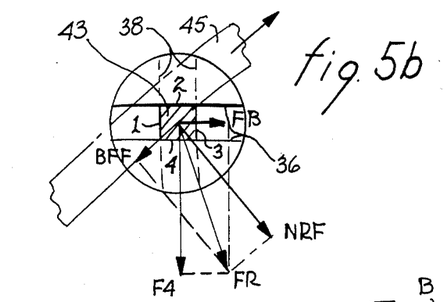
Figure 6A:
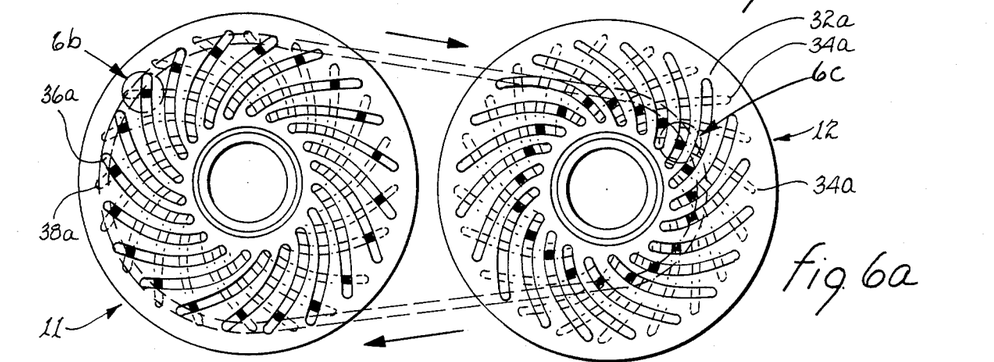

In FIG. 5b there is shown an enlargement of the intersection between the logarithmic spiral guideway 36 and logarithmic spiral guideway 38 together with the forces acting thereon when moved by the belt 45. In this Figure the force BFF (Belt Friction Force) is shown parallel and opposite to the direction of belt movement at that point and the net radial force which is at right angles to the direction of the belt frictional force is shown as NRF. An effective belt friction coefficient is defined by the magnitude of BFF divided by the radial force between the belt and belt drive element. That is to say, the ratio of frictional force relative to the belt direction to the belt radial force perpendicular to the belt direction is the effective coefficient of friction and this could be a value varying over a wide range, for example, from 0.02 or 0.03 to values larger than 1. Particular belt materials, for example, and belt drive element materials are chosen to give the desired high values for the friction coefficient.

NRF being the net radial force is defined as the radial force resulting from the belt tension and the change in direction of belt passing over the belt drive element diminished by the centrifugal force of the belt drive element. While, in some cases, the centrifugal force of the belt drive elements is very significant and reduces the value of NRF or even change its direction, the relative magnitude of BFF and NRF shown in FIG. 5b represent typical values in most cases at the critical maximum design operating conditions.

The combination of the force BFF and the force NRF is represented by FR (resultant force) which is arrived at by completing the parallelogram defined by BFF and NRF. The resultant force FR is, of course, exerted by the square ends 43 of the drive element 41 upon guideway surfaces. The end 43 of the drive element is supported within the intersection formed by the logarithmic spiral guideways 36 and 38. This intersection may be characterized by the surfaces 1, 2, 3 and 4 of the drive element ends representing the square sides, the surfaces 1 and 3 bearing on logarithmic spiral guideway 38 and the surfaces 2 and 4 bearing on logarithmic spiral guideway 36. The resultant force FR may then be resolved into its two components F3 which is along the direction of the spiral guideway 36 and F4 perpendicular thereto, or in the direction of the spiral guideway 38. Resolving the force FR into the components F3 and F4 illustrates that the component F3 is small and the component F4 is large. F4 is the force of side 4 of the drive element end 43 against the logarithmic spiral guideway 36 which is part of the inner guideway disk 27 and thus is supported directly by the mechanical structure through to the shaft 15. F3, which is the small component, is the force of side 3 of the drive element end 43 against the logarithmic spiral guideway 38 which is part of the outer guideway disk 29 and thus is opposed or balanced by the hydraulic pressure in the chamber 47, i.e., is balanced by the hydraulic rotary actuator. It is to be noted that the force F3, which is proportional to hydraulic rotary actuator torque, is substantially smaller than the mechanical force F4. F4 is usually much larger than force F3 at the critical maximum torque pulley design point as shown typically in FIG. 5b.

Figure 5C:
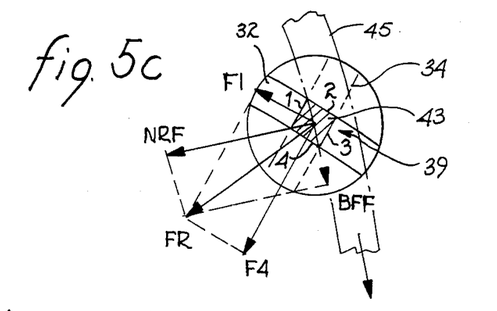

Referring to FIG. 5c which is an enlargement of the forces associated with the belt drive element 39 whose square end 43 is received in the intersection of the logarithmic spiral guideways 32 and 34. The belt frictional force BFF and the net radial force NRF are of the same magnitude essentially as shown in FIG. 5b but they occupy the directions shown parallel to and at right angles to the direction of movement of the belt 45 over the belt drive element 39. The resultant force FR of the forces BFF and NRF may then be resolved into forces; F1 of side 1 of the drive element end 43 against the logarithmic spiral guideway 34, and F4 of side 4 of the drive element end 43 against the logarithmic spiral guideway 32. The force F4 which is the larger of the forces F4 and F1 is exerted by side 4 against logarithmic guideway 32 and thus is supported by the mechanical structure directly down through to the shaft 15. On the other hand the smaller of the forces, F1, is exerted by side 1 and thus is balanced by the hydraulic pressure in the rotary actuator as previously described. It is to be noted that both in the cases of 5b and 5c the force F1, which is balanced by the hydraulic forces, is the smaller of the forces involved.

Figure 6B:
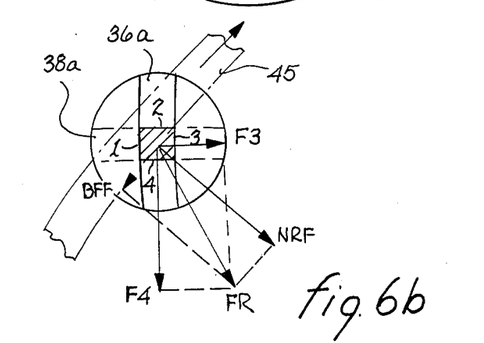
FIGS. 6b and 6c are enlargements of portions of FIG. 6a in approximately the same locations as those enlargements of FIGS. 5b and 5c.

Reference should now be made to FIG. 6a which is the same as FIG. 5a except that logarithmic spiral guideway 36 of FIG. 5a is shown as logarithmic spiral guideway 36a (the driving pulley) of FIG. 6a, the logarithmic spiral guideway 36a being in the opposite sense to that of logarithmic spiral 36 of FIG. 5a. The logarithmic spiral guideway 38 of outer guideway disk 29 is shown as logarithmic spiral guideway 38a of FIG. 6a and is in the reverse sense or direction as compared to logarithmic spiral 38. Correspondingly as to driven pulley 12 of FIG. 6a the logarithmic spiral 32a is in the reverse sense to logarithmic spiral 32 of FIG. 5a and the logarithmic spiral 34a is in the reverse sense as compared to logarithmic spiral 34 of FIG. 5a. FIG. 6b, corresponding enlargement of the forces exerted by the square end 43 of the drive element 41 is to be compared to the forces illustrated on FIG. 5b. Correspondingly the forces illustrated in FIG. 6c correspond to those exerted by the end 43 of the drive element 39 and are to be compared with the forces shown on FIG. 5c. It is to be born in mind that forces of FIG. 6b and 6c differ from those of FIG. 5b and 5c only by the effects caused by the reversal of the sense or direction of the logarithmic spiral grooves relative to the belt direction of movement. The direction of movement of the belt remains the same.

The forces shown in FIG. 6b correspond to those existing on the end 43 of the belt drive element 41 with the reverse sense of the logarithmic spiral groove and may be compared with the forces and the parts sustaining them as shown in FIG. 5b. In FIG. 6b the force F3 is substantially identical in magnitude to the force F3 in FIG. 5b and the force F4 is substantially identical in magnitude to the force F4 in FIG. 5b, these forces having been arrived at by the resolution of the belt friction force BFF and the net radial force NRF in the same manner as for FIG. 5. The force F3, the smaller of the forces, is now exerted by the side 3 of the end 43 of belt drive element 41 against the logarithmic spiral guideway 36a. The force F4, by far the larger of the forces, is exerted by side 4 of the end 43 of belt drive element 41 against the side of the logarithmic spiral 38a of outside guideway disk 29 and thus is balanced by the hydraulic pressure in the rotary actuator which is connected to the guideway disk 29. The force F4 requiring hydraulic balancing pressure is much greater than F3 in FIG. 6b.

Figure 6C:
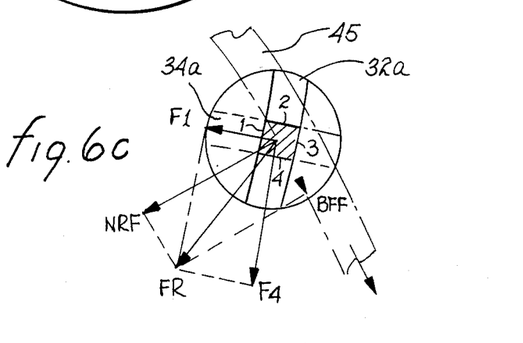

In FIG. 6c the forces are arrived at in the same manner as for the preceding figures and it will be noted that the force F1 is exerted by side 1 of the end 43 of the belt drive element 39 against the side of the logarithmic spiral 32a of the inner guide disk 19 and thus is supplied mechanically and directly through to the shaft 15. The other force F4, by far the larger of the forces needed to be balanced, is exerted by the side 4 of the end 43 of the belt drive element 39 against the side of the logarithmic spiral guideway 34a, the outer guideway disk, and thus must be balanced by the hydraulic pressure in the rotary actuator. Thus in each case of FIG. 6b and 6c compared with FIGS. 5b and 5c, a mere reversing of the sense or direction of the logarithmic spiral guideways relative to the belt direction, results in a much larger force required to be supplied by the hydraulic pressure in the rotary actuator.

Figure 5D:
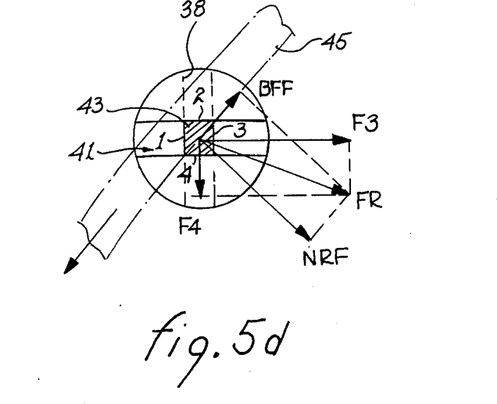
FIGS. 5d and 5e are enlargements at approximately the same locations as FIGS. 5b and 5c, but with the belt direction reversed.

The effect of reversing the direction of belt rotation while leaving the direction or sense of the logarithmic spiral guideways to be the same needs to be considered. This is illustrated by comparing FIGS. 5d and 5e with FIGS. 5b and 5c. The forces illustrated by FIGS. 5d and 5e correspond to the case illustrated by FIG. 5a except that the direction of the belt has been reversed from A to B. Thus, comparing FIG. 5d to FIG. 5b it will be noted that the belt frictional force BFF has been reversed in the case of FIG. 5d compared to that of FIG. 5b. The net radial force NRF always extends in each case towards the center of the structure. Completing the force diagram of forces BFF and NRF gives a resultant force of FR, as shown, and when this force is resolved into its two components F3 and F4, it will be noted that F4 is much smaller than F3 which is precisely the reverse of that shown in FIG. 5b wherein F3 was small and F4 was large.

Recalling that the force F3 was balanced by the hydraulic pressure in the rotary actuator it will be seen that in the case of FIG. 5d, where the belt direction has been reversed, the force necessary to be supplied by the rotary actuator is much greater. Similarly the force F4 mechanically through the structure to the shaft 15 as already described is much smaller.

Figure 5E:
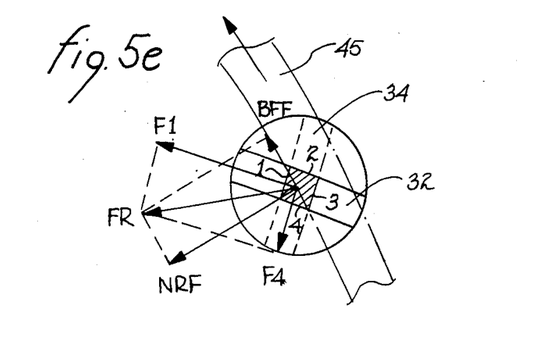

Now comparing the force diagram of FIG. 5e which is that for the pulley 12, it will be noticed that the belt frictional force BFF of FIG. 5e is in the reverse direction as compared with that same force in the corresponding FIG. 5c. The net radial force always extends to the center of the structure and the resultant FR results from the vector addition of the two forces BFF and NRF. Resolving the resultant force FR into its two components F1 and F4, it will be noted that the component F4 of FIG. 5e is much smaller than the corresponding component F4 of FIG. 5c. F4 is the force which is supplied mechanically through the structure to the shaft 15 and illustrates that in the case of the reversed belt direction, the mechanical connection to the shaft 15 supports a much smaller force F4 than the larger force F4 of FIG. 5c. Correspondingly the force $F_1$ which is that balanced by the hydraulic pressure in the rotary actuator is much larger in the reversed belt case of FIG. 5e as compared with the regular belt direction operation F1 of FIG. 5c.

Thus, where the belt direction has been reversed, the force necessary to be supplied by the hydraulic structure, rotary actuator, is much greater than that when the belt is moving in the first direction.

It has been shown, therefore, that the case requiring the least pressure in the hydraulic actuator is that as illustrated in FIG. 5a wherein, as to the driving pulley, the sense of the logarithmic guideway of the inner guideway disks, which are supported directly in a mechanical fashion by the shaft 15, are in the opposite sense to that of the belt direction and; as to the driven pulley, the logarithmic spiral guideways in the inner guideway disks, which is also that supported directly by the shaft 15 are in the same sense as the direction of the driving belt. When the directions of the spiral guideways are reversed or when the belt direction is changed the hydraulic force necessary to balance the forces exerted by the drive elements in their location is very much increased.

It is to be noted that if it is intended to reverse the direction of belt rotation, while leaving the designation of the driving pulley to remain the same, the spiral direction of the pulley guideways needs to be reversed in order to achieve the desired large reduction in the operating hydraulic pressure.

The belt and pulleys are, in effect, oriented with respect to each other for the improved results.

A further advantage is obtained when the inner guideway disks are mechanically supported by the shaft in that the moment of forces at the ends of the belt drive element is reduced resulting in a major reduction of specific bending stresses in the belt drive element.

Thus, referring to FIG. 7, there is shown diagrammatically a belt drive element 39, 41 which has a drive surface 42 depressed, or offset, to correspond with the center line of the end 43 of the belt drive element. Two guideway disks, for example, 27 and 29 are shown as supporting the end portion 43. It will be recalled that the inner guideway disk 27 is that supported mechanically in a direct fashion by the shaft of the structure and the guideway disk 29 is that supported by the hydraulic pressure in the rotary actuator. Since the guideway disk member 27 is closest the area where the drive belt exerts its force upon the drive element (the forces being shown diagrammatically by the letters F) the bending moment existing at the juncture J between the end portion 43 and the center part or belt engaging portion 42 is much reduced, as compared with the case where the guideway disk 27 would be at the end of the end member 43, at the location of the outer guideway disk 29, which is that supported by the hydraulic pressure in the rotary actuator.

Thus in the structure according to the invention the bending moment existing in the belt drive element is reduced by having the inner guideway disk structure supported directly and mechanically on the shaft of the device while at the same time the operating pressure in the hydraulic actuator is reduced by having the logarithmic spiral guideways of the driving pulley in the same sense as the belt movement and in the reverse sense in the driven pulley.

While the construction illustrated uses a hydraulic rotary actuator to supply the necessary balance torques and resulting forces, springs could also be used in the rotary actuators to supply such balance torques and resulting forces in certain applications of this construction. Also, in other applications, the centrifugal force of the belt drive elements will give torques and forces on the guideway disks of sufficient magnitude to either add significantly to the rotary actuator torques and forces or in some cases even completely replace the rotary actuator torques and forces. However, the significant advantages obtained by the orientation of the guideway disks relative to the direction of rotation as shown herein apply directly to such other constructions.

In other applications it may be sufficient to use springs on the rotary actuator of only one pulley while there is a hydraulic mechanism on the other pulley, or there may be a combination.

While one form of the invention has been shown it will be understood that there are many others which are within the scope of the present disclosure and accordingly within the scope of the appended claims.

We claim:

1. A belt drive system comprising a driving pulley and a driven pulley, a belt extending around said pulleys, each of said driving and said driven pulleys including a first pair of inner pulley disks having logarithmic spiral guideways of one sense formed therein and mounted for rotation as a unit on a shaft and fixed to said shaft and a second pair of outer pulley disks having logarithmic spiral guideways of an opposing sense formed therein and mounted for rotation as a unit on said shaft but having limited circular movement relative to said first pair of pulley disks, one of said second pair of pulley disks being disposed adjacent but exterior to one of said first pair of pulley disks and the other one of said second pair of pulley disks being disposed adjacent but exterior to the other one of said first pair of pulley disks, the logarithmic spiral guideways of said one of said first pair of pulley disks and the logarithmic spiral guideways of said one of said second pair of pulley disks forming first intersections, the logarithmic spiral guideways of said other one of said first pair of pulley disks and the logarithmic spiral guideways of said other one of said second pair of pulley disks forming second intersections, belt drive elements extending between respective ones of said first and said second intersections, said belt extending around the belt drive elements of said driving pulley and the belt drive elements of said driven pulley, and having a designated direction of rotation, the sense of said logarithmic spiral guideways of said first pair of inner pulley disks of said driving pulley being opposed to said designated direction of rotation, the sense of said logarithmic spiral guideways of said first pair of inner pulley disks of said driven pulley being the same as said designated direction of rotation, and means associated with said second pair of outer pulley disks of each of said driving and driven pulleys for rotating said second pair of outer pulley disks relative to said first pair of inner pulley disks.

2. The belt drive system according to claim 1 wherein said means associated with said second pair of outer pulley disks comprises hydraulic means.

3. In a belt drive system comprising a driving pulley and a driven pulley, a belt extending around said pulleys, each of said driving and said driven pulleys including a first pair of inner pulley disks having logarithmic spiral guideways of one sense formed therein and mounted for rotation as a unit on a shaft and fixed to said shaft and a second pair of outer pulley disks having logarithmic spiral guideways of an opposing sense formed therein and mounted for rotation as a unit on said shaft, but having limited circular movement relative to said first pair of pulley disks, one of said second pair of pulley disks being disposed adjacent but exterior to one of said first pair of pulley disks and the other one of said second pair of pulley disks being disposed adjacent but exterior to the other one of said first pair of pulley disks, the logarithmic spiral guideways of said one of said first pair of pulley disks and the logarithmic spiral guideways of said one of said second pair of pulley disks forming first intersections, the logarithmic spiral guideways of said other one of said first pair of pulley disks and the logarithmic spiral guideways of said other one of said second pair of pulley disks forming second intersections, belt drive elements extending between respective ones of said first and said second drive intersections, said belt extending around the belt drive elements of said driving pulley and the belt drive elements of said driven pulley, and having a designated direction of rotation, and hydraulic means associated with said second pair of outer pulley disks of each of said driving and driven pulleys for rotating said second pair of outer pulley disks relative to said first pair of inner pulley disks, whereby for reducing the operating pressure of said hydraulic means the sense of said logarithmic spiral guideways of said first pair of inner pulley disks of said driving pulley is opposed to said designated direction of rotation, and the sense of said logarithmic spiral guideways of said first pair of inner pulley disks of said driven pulley is the same as said designated direction of rotation.

4. The belt drive system according to claim 2 wherein said hydraulic means comprises chamber means including a strut attached to said outer pulley disks and a strut inside of said chamber means and attached to said shaft, the space between said struts defining operating pressure chambers.

* * * * *

UNITED STATES PATENT AND TRADEMARK OFFICE
CERTIFICATE OF CORRECTION

PATENT NO. : 4,714,452
DATED : December 22, 1987
INVENTOR(S) : Emerson L. Kumm

It is certified that error appears in the above-identified patent and that said Letters Patent is hereby corrected as shown below:

Column 4, line 12, the word "counterclockwise" should be ---clockwise---.

On the drawings, sheet 2, fig. 2, the reference numeral "41" should be ---39---.

Signed and Sealed this

Twenty-sixth Day of December, 1989

Attest:

JEFFREY M. SAMUELS

Attesting Officer     Acting Commissioner of Patents and Trademarks